United States Patent
Zhong

(10) Patent No.: US 6,383,675 B1
(45) Date of Patent: May 7, 2002

(54) LANTHANUM NICKEL COMPOUND/METAL MIXTURE AS A THIRD ELECTRODE IN A METAL-AIR BATTERY

(75) Inventor: Zhimin Zhong, Middleburg Hts., OH (US)

(73) Assignee: Zinc Air Power Corporation, Strongsville, OH (US)

( * ) Notice: Subject to any disclaimer, the term of this patent is extended or adjusted under 35 U.S.C. 154(b) by 0 days.

(21) Appl. No.: 09/552,870

(22) Filed: Apr. 20, 2000

Related U.S. Application Data

(60) Provisional application No. 60/130,141, filed on Apr. 20, 1999.

(51) Int. Cl.[7] .................. H01M 12/00; H01M 4/66; H01M 4/70; H01M 4/88; H01M 4/90
(52) U.S. Cl. .................. 429/27; 429/40; 429/44; 429/218.1; 429/232; 429/233; 429/234; 429/238; 429/241; 429/242; 29/623.5; 427/115
(58) Field of Search .................. 429/27, 40, 44, 429/218.1, 219, 220, 222, 223, 233, 234, 241, 242, 246, 232, 238; 29/623.5; 427/115

(56) References Cited

U.S. PATENT DOCUMENTS

| | | | |
|---|---|---|---|
| 3,874,928 A | 4/1975 | Will | 136/6 |
| 3,899,357 A | 8/1975 | Rinaldi et al. | 136/121 |
| RE28,792 E | 4/1976 | Ruka et al. | 204/1 |
| 4,004,943 A | 1/1977 | Boter | 429/59 |
| 4,076,611 A | 2/1978 | Gray | 204/290 |
| 4,107,395 A | 8/1978 | Van Ommering et al. | 429/21 |
| 4,112,199 A | 9/1978 | Dunlop et al. | 429/29 |
| 4,276,202 A | 6/1981 | Schmidberger et al. | 252/462 |
| 4,419,424 A | 12/1983 | Julian | 429/217 |
| 4,511,636 A | 4/1985 | Vogel et al. | 429/41 |
| 4,585,710 A | 4/1986 | McEvoy | 429/27 |
| 4,799,936 A | 1/1989 | Riley | 29/623 |

(List continued on next page.)

*Primary Examiner*—Gabrielle Brouillette
*Assistant Examiner*—Jonathan Crepeau
(74) *Attorney, Agent, or Firm*—Renner, Otto, Boisselle & Sklar, LLP

(57) ABSTRACT

In one embodiment, the present invention relates to a third electrode for use in a metal-air tricell comprising a support structure coated with a layer of a lanthanum nickel compound and at least one metal mixture, wherein the mixture is adhered to the support structure without the use of an adhesive. In another embodiment, the present invention relates to a metal-air tricell comprising: an air electrode; a metal electrode; and a third electrode, wherein the third electrode comprises a support structure coated with a mixture of a lanthanum nickel compound and at least one metal, wherein the mixture is adhered to the support structure without the use of an adhesive. Additionally, the present invention also relates to a method of forming a third electrode for use in a metal-air tricell comprising the steps of: (A) applying a mixture of a lanthanum nickel compound and at least one metal oxide to a support structure, thereby yielding a coated support structure; and (B) heating the coated support structure in order to reduce the metal oxide present in the lanthanum nickel compound/metal oxide mixture to its corresponding metal and to adhere the mixture to the support structure, thereby yielding a third electrode wherein the third electrode is free of an adhesive.

45 Claims, 3 Drawing Sheets

U.S. PATENT DOCUMENTS

| | | | |
|---|---|---|---|
| 4,842,963 A | 6/1989 | Ross, Jr. | 429/21 |
| 4,851,303 A | 7/1989 | Madou et al. | 429/13 |
| 4,894,296 A | 1/1990 | Borbely et al. | 429/27 |
| 5,045,169 A | 9/1991 | Feduska et al. | 204/258 |
| 5,064,733 A | 11/1991 | Krist et al. | 429/17 |
| 5,080,689 A | 1/1992 | Pal et al. | 29/623.5 |
| 5,134,042 A | 7/1992 | Madou et al. | 429/13 |
| 5,200,281 A | 4/1993 | Leap et al. | 429/129 |
| 5,266,419 A | 11/1993 | Yamada | 429/30 |
| 5,279,905 A | 1/1994 | Mansfield, Jr. et al. | 429/27 |
| 5,306,579 A | 4/1994 | Shepard et al. | 429/40 |
| 5,308,712 A | 5/1994 | Seike et al. | 429/30 |
| 5,342,703 A | 8/1994 | Kawasaki et al. | 429/30 |
| 5,360,680 A | 11/1994 | Goldman et al. | 429/27 |
| 5,441,820 A | 8/1995 | Sin et al. | 429/17 |
| 5,445,901 A | 8/1995 | Korall et al. | 429/27 |
| 5,487,955 A | 1/1996 | Korall et al. | 429/26 |
| 5,506,076 A | 4/1996 | Miyamoto et al. | 429/223 |
| 5,523,283 A | 6/1996 | Simon et al. | 505/239 |
| 5,688,611 A | 11/1997 | Golben | 429/53 |
| 5,788,876 A | 8/1998 | Chen | 252/62.9 |
| 5,804,334 A | 9/1998 | Yamamura et al. | 429/218 |

LANTHANUM NICKEL COMPOUND/METAL MIXTURE AS A THIRD ELECTRODE IN A METAL-AIR BATTERY

RELATED APPLICATION DATA

This application claims priority to previously filed U.S. Provisional Application No. 60/130,141, filed on Apr. 20, 1999, entitled "Lanthanum Nickel Compound/Metal Composite as a Third Electrode in a Metal-Air Battery", which is herein incorporated by reference in its entirety.

TECHNICAL FIELD

The present invention generally relates to electrochemical cells. In particular, the present invention relates to a third electrode, charging electrode, or counter-electrode (hereinafter simply referred to as a third electrode) for a metal-air battery formed from a mixture of a lanthanum nickel compound and a conductive metal, and to a method for forming the same.

BACKGROUND ART

Recently, in response to increasing environmental concerns, research into alternatively powered vehicles has increased. One area of research which has drawn particular interest is battery powered vehicles. Such vehicles are more environmentally friendly than conventionally powered gas or diesel vehicles because the amount of harmful emissions (e.g., $CO_2$, $NO_x$ and hydrocarbons) is vastly reduced or eliminated.

One type of battery that has drawn particular interest is metal-air cells. Metal-air cells are well known and desirable as light-weight sources of power. Metal-air cells utilize oxygen from ambient air as a reactant in an electrochemical reaction. Metal-air cells can include an air permeable electrode as a cathode and a metallic anode surrounded by an aqueous electrolyte. Metal-air cells function through the reduction of oxygen from ambient air which reacts with the metal to generate an electric current. For example, in a zinc-air cell, the anode contains zinc, and during operation, oxygen from the ambient air along with water and electrons present in the cell are converted at the cathode to hydroxyl ions. Conversely, at the anode zinc atoms and hydoxyl ions are converted to zinc oxide and water, which releases the electrons used at the cathode portion of the cell. Thus, the cathode and anode acting in concert generate electrical energy.

Specifically, the reactions which take place at the cathode and anode are shown in detail below.

Cathode Reaction: 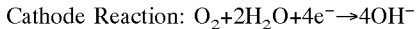

Anode Reaction: 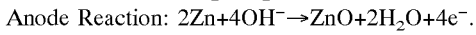

Cells that are useful for only a single discharge cycle are called primary cells, and cells that are rechargeable and useful for multiple discharge cycles are called secondary cells. An electrically rechargeable metal-air cell is recharged by applying voltage between the anode and the cathode of the cell and reversing the electrochemical reaction. During recharging the cell discharges oxygen to the atmosphere through the air permeable cathode.

There are two main types of rechargeable metal-air cells. The first type includes those with three electrodes (i.e., tricells), namely, an anode, a unifunctional cathode, and a counter-electrode (i.e. a third electrode). The unifunctional cathode is used during the discharge cycle of the metal-air and is incapable of recharging the cell. The counter-electrode is required to recharge the metal-air cell. The second type of metal-air cells include two electrodes. The bifunctional electrodes function in both the discharge mode and the recharge mode of the cell, thus eliminating the need for a third electrode. However, bifunctional electrodes suffer from a major drawback. That is, they do not last long because the recharging cycle deteriorates the discharge system (i.e., bifunctional cells suffer from decreasing performance as the number of discharge/recharge cycles increase). Thus, in view of the above, tricells are advantageous when compared to bifunctional cells in that they offer more stable performance over a greater number of discharge/recharge cycles.

One of the important aspects of a metal-air cell is the two types catalysts used for oxygen reduction during discharge and for oxygen evolution during recharge. For example, catalysts which can be used for the oxygen reduction catalyst include silver, platinum, platinum-ruthenium, nickel spinel, nickel perovskites, and iron, nickel, or cobalt macrocyclics. On the other hand, oxygen evolution catalysts can include, for example, tungsten compounds such as $CoWO_4$, WC, $WS_2$, and WC containing fused cobalt. In addition, metal oxides such as $LaNiO_3$, $NiCo_2O_4$ and $Co_3O_4$ are known to be useful as oxygen evolution catalysts.

Furthermore, most metals and alloys, even platinum and other precious metals and alloys, are not good oxygen evolution catalysts in strong alkaline electrolytes. They either suffer from low activity or their activity fades quickly after just a small number of discharge/recharge cycles. In addition, some active metal/metal oxides such as Ru tend to dissolve in an alkaline system. Also, most if not all metal and alloys suffer from oxidation due to the high electrical potential generated in the metal-air cell.

Metal oxides such $LaNiO_3$, $NiCo_2O_4$ and $Co_3O_4$ have been bonded with TEFLON® (a tetrafluoroethylene fluorocarbon polymer) and tested as a third electrode in a tricell. Such third electrodes suffer from the problem that bonded oxides on the surface of the third electrode flake off (i.e., delaminate) during oxygen evolution tests. Due to delamination, such third electrodes lose their activity over time.

One solution to the above problem is disclosed in U.S. Pat. No. 4,497,698 to Bockris et al. U.S. Pat. No. 4,497,698 discloses sintering pure $LaNiO_3$ powder to a ceramic form, then binding the ceramic $LaNiO_3$ to copper wire with a silver epoxy resin. Such an electrode, when tested, has been found to be stable for over 1000 hours of oxygen evolution. However, such a solid electrode is difficult to use as a third electrode in a secondary metal-air cell (i.e. a tricell), for example a zinc-air cell. This is because the solid electrode cannot be put between the metal electrode (e.g., the zinc electrode) and the air electrode (e.g., a platinum electrode) as there is no opening for the electrolyte (e.g., sodium hydroxide) to flow through the third electrode. Such a structure therefore restricts the flow of ions (e.g., hydroxyl ions) between the metal electrode and the air electrode.

Additionally, it can be difficult to bind/adhere a $LaNiO_3$ ceramic to metal to form an electrode. This is because the interface must be carefully protected with extra epoxy or the like, otherwise it will oxidize quickly. Also the silver in the epoxy used to bind the $LaNiO_3$ ceramic to the metal can also oxidize. Finally, an electrode which utilizes silver epoxy to bind the $LaNiO_3$ ceramic to the metal is thick and therefore contributes to an undesirable increase in both battery size and weight. This in turn leads to a decrease in battery performance.

In view of the above, there is a need in the art for improved metal-air batteries.

SUMMARY OF THE INVENTION

The present invention provides a third electrode (i.e. a counter-electrode) for use in a metal-air tricell battery formed from a mixture of an lanthanum nickel compound and at least one metal oxide, and support structure such as a mesh screen, a metal planar sheet or a series of rigid rods or wires, and to a method for forming the same. The present invention provides a third electrode that not only produces oxygen during recharge (or initial charge) for a metal-air tricell but also provides stable performance over a large number of discharge/recharge cycles. This in turn leads to improved metal-air batteries based on tricells which incorporate such a third electrode.

In one embodiment, the present invention relates to a third electrode for use in a metal-air tricell comprising a support structure coated with a layer of a lanthanum nickel compound/at least one metal mixture, wherein the mixture is adhered to the support structure without the use of an adhesive.

In another embodiment, the present invention relates to a metal-air tricell comprising: an air electrode; a metal electrode; and a third electrode, wherein the third electrode comprises a support structure coated with a mixture of a lanthanum nickel compound and at least one metal, wherein the mixture is adhered to the support structure without the use of an adhesive.

In another embodiment, the present invention relates to a method of forming a third electrode for use in a metal-air tricell comprising the steps of: (A) applying a mixture of a lanthanum nickel compound and at least one metal oxide to a support structure, thereby yielding a coated support structure; and (B) heating the coated support structure in order to reduce the metal oxide present in the lanthanum nickel compound/metal oxide mixture to its corresponding metal and to adhere the lanthanum nickel compound/metal mixture to the support structure, thereby yielding a third electrode wherein the third electrode is free of an adhesive.

In one embodiment, step (A) of the above mentioned method comprises: (A-1) mixing a lanthanum nickel compound, at least one metal oxide and at least one dispersant to form a lanthanum nickel compound/metal oxide suspension; and (A-2) applying the lanthanum nickel compound/metal oxide suspension to the support structure to yield a coated support structure.

In one embodiment, step (B) of the above mentioned method comprises heating the coated support structure for about 5 to about 20 hours at a temperature in the range of 150° C. to about 1350° C.

In another embodiment, step (B) of the above mentioned method comprises: (B-1) heating the coated support structure at a first temperature sufficient to reduce the metal oxide present in the lanthanum nickel compound/metal oxide mixture to its corresponding metal; and (B-2) heating the coated support structure at a second temperature sufficient to adhere the lanthanum nickel/metal mixture to the support structure without the use of an adhesive.

In another embodiment, the present invention relates to a method of forming a third electrode for use in a metal-air tricell comprising the steps of: (A) forming a suspension of a lanthanum nickel compound, at least one metal oxide compound and at least one dispersant; (B) applying the lanthanum nickel compound/metal oxide suspension to a support structure, thereby yielding a coated support structure; (C) heating the coated support structure to drive off the dispersant, reduce the metal oxide present in the lanthanum nickel compound/metal oxide suspension to its corresponding metal and to adhere the resulting lanthanum nickel compound/metal mixture to the support structure, thereby yielding a third electrode wherein the third electrode is free of an adhesive.

DISCLOSURE OF THE PREFERRED EMBODIMENTS

The present invention involves a process for producing improved metal-air batteries which contain a third electrode coated with a mixture of a lanthanum nickel compound and at least one metal. The present invention more specifically involves a process whereby a mixture of a lanthanum nickel compound and at least one metal oxide mixture is applied to a third electrode, heated at a first temperature sufficient to form a lanthanum nickel compound/metal mixture, and reheated at a second temperature sufficient to bond, adhere or fuse the lanthanum nickel compound/conductive metal mixture to the third electrode. In another embodiment, the lanthanum nickel compound/metal mixture is bonded to the third electrode without the use of an adhesive. That is, the third electrode is free of an adhesive such as, for example, an epoxy, glue, or acrylic polymer.

In one embodiment, the application of the lanthanum nickel compound/metal oxide mixture to the third electrode is accomplished by forming a suspension, slurry or ink of a lanthanum nickel compound, at least one metal oxide and at least one dispersant. The at least one dispersant may further contain water, or water may be added thereto. The dispersant can be, for example, Rohm-Haas polymer dispersant DURAMAX™ D-3007 (which is available from Rohm-Hass of Philadelphia, Pa., and is mostly an acrylic polymer in combination with water). Alternatively, any suitable dispersant can be used, for example DARVAN® Nos. 1, 2, 6, 7, 9 and/or 9L (available from R.T. Vanderbilt Co. of Norwalk, Conn.). The above-mentioned DARVAN® dispersants all contain an organic sodium salt such as sodium lignosulfonate (DARVAN® No. 2). By adding at least one dispersant to the lanthanum nickel compound/metal oxide mixture it is possible to form a suspension, ink or slurry. Such a mixture can then be applied to the third electrode by any one of a variety of methods including, but not limited to, painting, spraying, atomization or vapor deposition. Alternatively, if no dispersant and/or water is utilized, the lanthanum nickel compound/metal oxide mixture can be applied to the third electrode by any suitable means for applying a powdered substance to a substrate including, but not limited to, methods of plasma spraying, spraying, sputtering, sprinkling, spreading, atomization, and/or vapor depositing the mixture onto the support structure.

Figure 1:
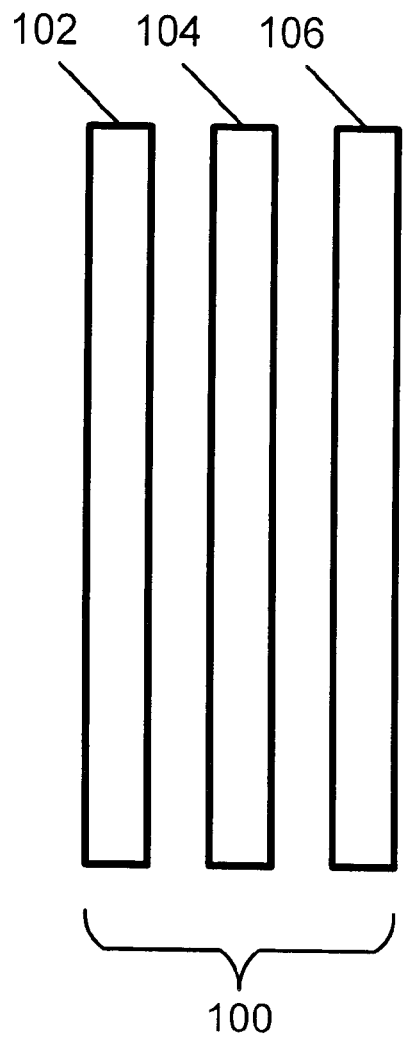
FIG. 1 is a partial exploded side-view of the structure of the electrodes in a metal-air tricell in accordance with one embodiment of the present invention.
Figure 2:
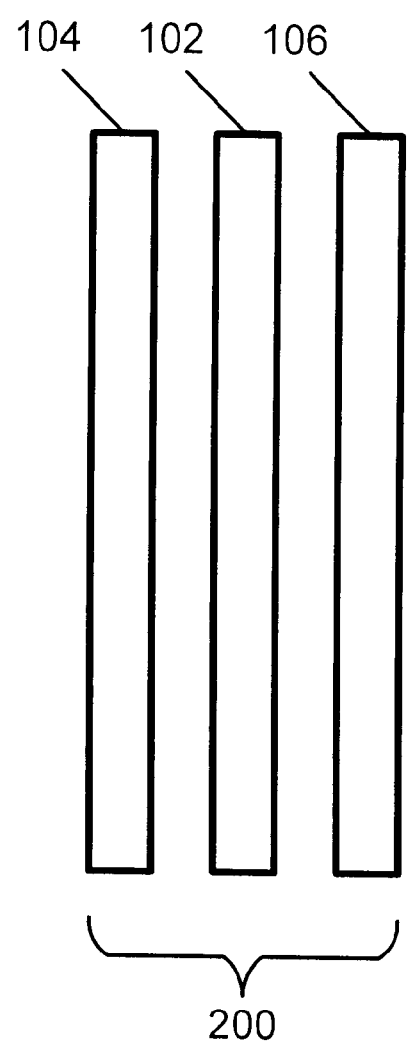
FIG. 2 is a partial exploded side-view of the structure of the electrodes in a metal-air tricell in accordance with another embodiment of the present invention.

Referring initially to FIGS. 1–2, FIGS. 1–2 show a partial exploded side-view of two different tricell embodiments which incorporate therein a third electrode 104, made in accordance with the present invention, an air electrode 102 and a metal electrode 106. In FIG. 1, the third electrode 104 of tricell 100 is positioned between the air electrode 102 and the metal electrode 106. In FIG. 2, the metal electrode 106 of tricell 200 is positioned between the air electrode 102 and the third electrode 104.

The embodiment of FIG. 2 provides a further increase in the power output of a tricell. Such a structure permits an open separator (i.e., a separator having at least one through hole therein) to be used between the air electrode 102 and the metal electrode 106, thereby increasing the power output of such a tricell. Commonly the separator is covered with from 1 to about 10 layers of a microporous material (e.g., CELGARD® 3401). Such a separator permits the flow of electrolyte during discharge between the air electrode 102 and the metal electrode 106. The electrolyte may be any suitable alkali electrolyte. Examples of such electrolytes are sodium hydroxide and potassium hydroxide.

If the embodiment of FIG. 1 is used, the third electrode 104 can be designed to function as both a third electrode and a separator. In other words, in one alternative embodiment, the third electrode 104 in the embodiment of FIG. 1 can also be covered with a microporous material.

The remaining structure of each of the tricells is conventional in nature and is known to those skilled in the art (see e.g., the above discussion relating to tricells). For example, *Metal-Air Batteries* by D P Gregory, BSG, PhD, published by Mills & Boon Limited, copyright 1972, discloses secondary metal-air cells and is incorporated herein by reference.

FIGS. 3A–3D are plan views of examples of a third electrode 104 made in accordance with the present invention. As can be seen from FIGS. 3A–3D, the third electrode 104 of the present invention contains numerous openings which permit the free flow of ions from the electrolyte between the air electrode 102 and the metal electrode 106 during the discharge cycle (e.g., hydroxyl ions from an electrolyte of potassium hydroxide). Even when the third electrode 104 is not positioned between the air electrode 102 and the metal electrode 106, the openings in the third electrode can still be utilized as they permit increased diffusion of ions during discharge.

The third electrode 104 is generally formed of at least one conductive metal, for example, copper, nickel, titanium, steel, silver, gold, palladium, or mixtures of two or more thereof, which has been coated with a mixture of a lanthanum nickel compound and at least one metal oxide, and then heated at a first temperature sufficient to convert the lanthanum nickel compound/metal oxide mixture to a lanthanum nickel compound/ metal mixture.

In one embodiment, the third electrode 104 is placed in an oven where the temperature is raised at a rate of about 0.5° C./min to about 2° C./min until the oven reaches a first temperature of about 150° C. to about 450° C. In another embodiment, the third electrode 104 is placed in an oven where the temperature is raised at a rate of about 0.5° C./min to about 2° C./min until the oven reaches a first temperature of about 250° C. to about 350° C. In yet another embodiment, the third electrode 104 is placed in an oven where the temperature is raised at a rate of about 0.5° C./min to about 2° C./min until the oven reaches a first temperature of about 310° C. Additionally, it should be noted that here and else where in the specification, range and ratio limits may be combined.

Alternatively, the third electrode 104 is placed in an oven where the temperature is raised at a rate of about 1° C./min until the oven reaches a first temperature of about 250° C. to about 350° C. In still another embodiment, the third electrode 104 is placed in an oven where the temperature is raised at a rate of about 0.5° C./min to about 2° C./min until the oven reaches a first temperature of about 310° C.

The coated third electrode 104 is heated at the desired first temperature for about 0.5 to about 2 hours in order to decompose the metal oxide and yield the corresponding metal. Alternatively, the coated third electrode 104 is heated at a first temperature of about 310° C. for about 1 hour in order to decompose the metal oxide and yield the corresponding metal.

Next, the third electrode 104 is heated at a second temperature sufficient to bind, adhere or fuse the lanthanum nickel compound/metal mixture to the third electrode 104. In one embodiment, the third electrode 104 is placed in an oven where the temperature inside the oven is raised to a second temperature of about 450° C. to about 1350° C. and is maintained there for about 5 to about 20 hours. Alternatively, the temperature inside the oven is raised to a second temperature of about 650° C. to about 1150° C. and is maintained there for about 7.5 to about 17.5 hours. In yet another embodiment, the second temperature is in the range of about 850° C. to about 1050° C. and is maintained for about 10 to about 15 hours.

The metal oxide portion of the lanthanum nickel compound/metal oxide mixture can be, for example, $Ag_2O$. In another embodiment, the metal oxide portion of the above mixture can be supplemented and/or replaced with at least one of a tin oxide ($SnO$ or $SnO_2$), nickel oxide ($NiO$), gold oxide ($Au_2O_3$), palladium oxide ($PdO$), cadmium oxide ($CdO$), or a copper oxide ($CuO$ or $Cu_2O$).

Figure 3A:
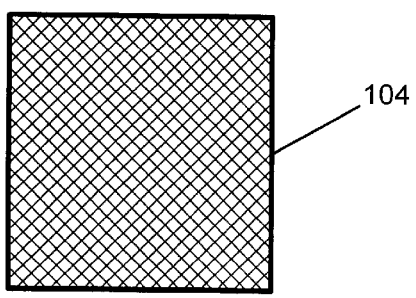
FIG. 3A is a plan view of a third electrode in accordance with one embodiment the present invention.

In one embodiment, as is shown in FIG. 3A, the third electrode 104 is generally a planar sheet of metal mesh which is formed from one of the above-identified metals. For example, a suitable mesh or expanded screen can be obtained from Exmet® Corporation of Naugatuck, Connecticut. Suitable mesh screens for use with the present invention typically have from about 1 opening per square inch to about 9600 openings per square inch. Alternatively, in one embodiment, the number of openings per square inch is chosen so that the openings constitute at least about 25% of the surface area of the face of the third electrode 104. In another embodiment, the number of openings per square inch is chosen so that the openings constitute at least about 50% of the surface area of the face of the third electrode 104. In yet another embodiment, the number of openings per square inch is chosen so that the openings constitute at least about 75% of the surface area of the face of the third electrode 104.

Additionally, it should be understood that the third electrode 104 may have various configurations not necessarily limited to a planar mesh sheet, such as those derived from woven filaments, expanded mesh, or a cellular structure such as a honeycomb.

Figure 3B:
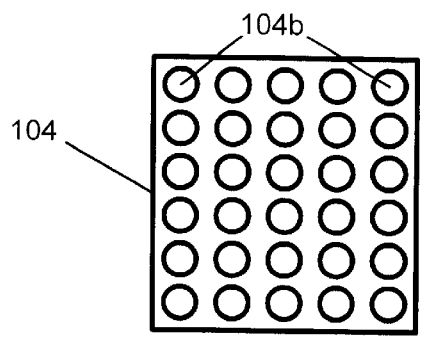
FIG. 3B is a plan view of a third electrode in accordance with another embodiment the present invention.
Figure 3C:
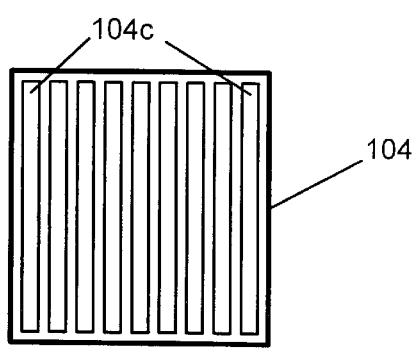
FIG. 3C is a plan view of a third electrode in accordance with another embodiment the present invention.
Figure 3D:
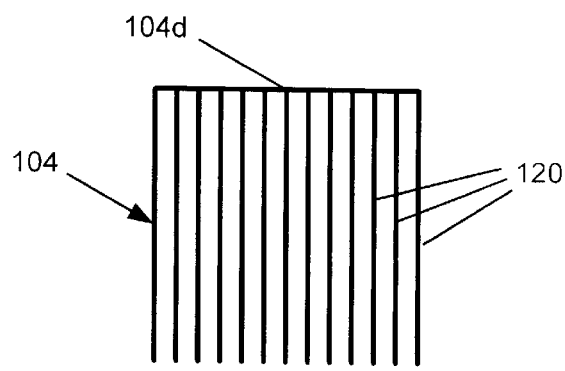
FIG. 3D is a plan view of a third electrode in accordance with another embodiment the present invention.

Alternatively, as is depicted in FIGS. 3B–3D, the third electrode 104 is formed from something other than a mesh screen, expanded mesh, or cellular structure such as a honeycomb. For example, in one embodiment (FIG. 3B), the third electrode 104 is formed from a metal planar sheet which contains a plurality of open areas or holes 104b. The holes 104b, although shown as circles, can be any shape (e.g., square, rectangular (FIG. 3C, holes 104c), polygonal, triangular, oval, or a combination of such shapes). In one embodiment, holes 104b constitute at least about 25% of the surface area of the face of the third electrode 104. In another embodiment, the holes 104b constitute at least about 50% of the surface area of the face of the third electrode 104. In yet another embodiment, the holes 104b constitute at least about 75% of the surface area of the face of the third electrode 104. The holes 104a, 104b, 104c may be introduced by any known process including, but not limited to, punching, cutting, drilling, weaving, welding, soldering, brazing or casting the material from which the third electrode 104 is formed.

Alternatively, as illustrated in FIG. 3D, the third electrode 104 may be comprised of a series of rigid rods or wires 120 projecting from a crown 104d. The rods or wires 120 may be suitably constructed of any of the conductive metals mentioned above. As a weight saving feature, the rods 120 alternatively may be formed of inert plastics, suitably polypropylene, nylon, fluoropolymers, polyvinylchloride or mixtures of two or more thereof, optionally all or some of which are coated with the said conductive metals. A combination of metal and plastic rods may be incorporated as well.

The third electrodes of FIGS. 3B–3D are then subjected to the same process as is described above with regard to the embodiment of FIG. 3A to yield a coated third electrode 104.

Furthermore, when the third electrode 104 is placed outside of the area between the air electrode 102 and the metal electrode 106, the third electrode 104 may be formed from a thin sheet of metal. Such a metal sheet may be composed of copper, nickel, titanium, steel, silver, gold, palladium or mixtures of two or more thereof, as is noted above. Such a third electrode 104 is then subjected to the same process as is described above with regard to the embodiment of FIG. 3A to yield a coated third electrode 104.

Hereinafter the present invention will be discussed in the case where lanthanum nickelate ($LaNiO_3$) is used for the lanthanum nickel compound and silver oxide ($Ag_2O$) is used as the at least one metal oxide which yields the conductive metal. Additionally, either a silver or nickel mesh screen (e.g., one from the Exmet® Corporation) will be used as the third electrode 104 (FIG. 3A). It should be noted that the present invention is not limited to the above case but rather other combinations of materials can be used as is discussed above. For example, the silver or nickel mesh screen may be replaced by a mesh screen made from a different metal where the metal is selected from those listed above.

In accordance with the present invention $LaNiO_3$ powder is produced by any one of a variety of methods. For example, U.S. Pat. No. 4,497,698 to Bockris et al. discloses that $LaNiO_3$ powder can be produced by a co-precipitation method. U.S. Pat. No. 4,497,698 is incorporated herein by reference in its entirety.

Specifically, pure lanthanum nickelate crystals may be synthesized using the following co-precipitation technique. The starting materials are essentially pure lanthanum nitrate hexahydrate [$La(NO_3)_3 \cdot 6H_2O$] and nickel nitrate hexahydrate [$Ni(NO_3)_2 \cdot 6H_2O$]. Stoichiometric amounts of each nitrate are weighed and dissolved in distilled water. Precipitates are produced by adding 1 molar NaOH with the pH being adjusted to about 11.

For example, 5.77 g of [$Ni(NO_3)_2 \cdot 6H_2O$] and 8.53 g of [$La(NO_3)_3 \cdot 6H_2O$] are dissolved in 200 ml of $H_2O$ and 90 ml of 1N NaOH is added to adjust the pH to 11 to produce the hydroxide precipitates. The resulting precipitates produced are promptly washed and centrifuged (in one embodiment repeatedly) to remove sodium ions and soluble salts. The obtained precipitates, which contain a mixture of hydroxides of La and Ni, are then oven dried for several hours at about 100° C., followed by heating in a furnace at about 800° C. for 16 hours in an $O_2$ atmosphere to form $LaNiO_3$ by the following reaction:

$$La(OH)_3 + Ni(OH)_2 + XO_2 \rightarrow LaNiO_3 + yH_2O.$$

The last heating step results in the formation of a Perovskite crystalline structure for the produced powder, which may be confirmed utilizing known X-ray diffraction procedures.

In another embodiment, the surface area (i.e. particle size) of the $LaNiO_3$ can be controlled by controlling the temperature at which the above reaction (calcination operation) is conducted.

For example, high surface area $LaNiO_3$ can be obtained by conducting the above reaction at about 700° C. to about 900° C. for about 4 to about 12 hours. In another embodiment, the high surface area reaction is conducted in at about 750° C. to about 850° C. for about 6 to about 10 hours. In still another embodiment, the high surface area reaction is conducted at about 800° C. for about 8 hours.

If low surface area $LaNiO_3$ (i.e., a larger particle size) is desired the above reaction is conducted at about 1000° C. to about 1200° C. for about 4 to about 12 hours. In another embodiment, the low surface area reaction can be conducted at about 1050° C. to about 1150° C. for about 6 to about 10 hours. In still another embodiment, the low surface area reaction can be conducted at about 1100° C. for about 8 hours.

Alternatively, other processes such as sol-gel, freeze drying, spray drying, or aerosol methods can be used to produce the required $LaNiO_3$ powder. One such reaction to produce the required $LaNiO_3$ is as follows:

$$2La_2O_3 + 4NiO + O_2 \rightarrow 4LaNiO_3.$$

Preferably, as will be explained in detail below, a foaming process using malic acid is used to produce the required $LaNiO_3$. A foaming process to produce the required $LaNiO_3$ is preferred because such a process yields a high surface area product. That is, in one embodiment of the present invention the $LaNiO_3$ powder used herein has a surface area of about 5 $m^2/g$ to about 35 $m^2/g$. In another embodiment, the $LaNiO_3$ powder used herein has a surface area of about 15 $m^2/g$ to about 25 $m^2/g$, and in another embodiment the $LaNiO_3$ powder used herein has a surface area of about 20 $m^2/g$.

$LaNiO_3$ FOAMING PROCESS EXAMPLES

Example 1

In a reaction vessel 6.6334 grams of $La_2O_3$ was dissolved in about 15 ml of concentrated nitric acid. Next, to this mixture was added 11.8411 grams of $Ni(NO_3)_2 \cdot 6H_2O$, 13.90 grams of malic acid, and 1.44 grams of alanine. The resulting mixture is next subjected to a drying process at a temperature of 150° C. until dry. Generally, near the end of the drying process the above mixture foams. As a result of the above procedure lanthanum oxide and nickel oxide were intimately mixed.

Alternatively, the drying process is conducted at a temperature in the range of about 100° C. to about 200° C. In yet another embodiment, the drying process can be conducted at a temperature in the range of about 125° C. to about 175° C.

Upon completion of the above drying process, the lanthanum oxide and nickel oxide were subjected to heating (calcination) at about 800° C. in an oxygen atmosphere in order to convert the lanthanum oxide and nickel oxide into $LaNiO_3$ powder having a high surface area.

The yield is approximately 10.0 grams of $LaNiO_3$ powder.

Example 2

In a reaction vessel 6.6334 grams of $La_2O_3$ was dissolved in about 15 ml of concentrated nitric acid. Next, to this mixture was added 11.8411 grams of $Ni(NO_3)_2.6H_2O$, 13.90 grams of malic acid, and 1.44 grams of alanine. The resulting mixture is next subjected to a drying process at a temperature in the range of about 150° C. until dry. Again, generally near the end of the drying process the above mixture foams. As a result of the above procedure lanthanum oxide and nickel oxide were intimately mixed.

Upon completion of the above drying process, the lanthanum oxide and nickel oxide were subjected to heating at about 1100° C. in an oxygen atmosphere in order to convert the lanthanum oxide and nickel oxide into $LaNiO_3$ powder having a lower surface area.

The yield is approximately 10.0 grams of $LaNiO_3$ powder.

After formation of a suitable amount of $LaNiO_3$, various amounts of $LaNiO_3$ were added together with silver oxide ($Ag_2O$) to produce a $LaNiO_3$/metal oxide mixture. The $LaNiO_3/Ag_2O$ mixture was then applied using any suitable technique, as described above and/or below, to a mesh screen having, for example, about 128 opening per square inch. The coated mesh screen was then heated at a first temperature to yield a $LaNiO_3$/Ag mixture and then was heated (sintered) at a second temperature to adhere the $LaNiO_3$/Ag mixture to the mesh screen without the use of an adhesive, thereby yielding a completed third electrode 104. The method used to create the $LaNiO_3$/Ag composite coated mesh screen third electrode 104 will be discussed in detail below by way of representative examples.

EXAMPLES REGARDING THE FORMATION OF THE $LaNiO_3$/Ag MIXTURE COATED MESH SCREEN

Example A (70/30 $LaNiO_3$/Ag Mixture) on a Silver Mesh Screen

Into a ball mill are inserted 21.0238 grams of fine $LaNiO_3$ (70% by weight), 9.6680 grams of $Ag_2O$ (30% by weight), 11.9778 grams of $H_2O$ and 0.4308 grams of Rohm-Haas polymer dispersant DURAMAX™ D-3007. An additional 1.5 grams of water are added to the mixture in order to facilitate the ball milling of the above ingredients. A $LaNiO_3/Ag_2O$ mixture is yielded after the above ingredients are throughly mixed. A thin coating of the $LaNiO_3/Ag_2O$ mixture is applied by a suitable method (e.g., painting, spraying, etc.) onto a silver mesh screen to yield a coated silver mesh screen.

The above-coated silver mesh screen is placed in an oven where the temperature is raised at a rate of about 1° C./min until the oven reaches a first temperature of about 310° C. This temperature is maintained for about 1 hour in order to decompose the $Ag_2O$ and yield Ag.

Thereafter, the temperature inside the oven is raised to a second temperature of about 950° C. and maintained there about 10 hours so as to adhere, bond or fuse the $LaNiO_3$/Ag mixture to the third electrode without the use of an adhesive.

After completion of the process all of the original openings in the silver mesh screen remain open and unblocked even after the above mixture was bonded, via the above process, to the silver mesh screen.

The above process is repeated three more times in order to yield a total of four coated silver mesh screens according to Example A.

Example B (70/30 $LaNiO_3$/Ag Mixture) on a Nickel Mesh Screen

The mesh screen of Example B is prepared according to the method detailed in Example A except that a nickel mesh screen is used instead of the silver mesh screen of Example A. This process is repeated three more times in order to yield a total of four coated nickel mesh screens according to Example B.

Example C (45/55 $LaNiO_3$/Ag Mixture) on a Silver Mesh Screen

The mesh screen of Example C is prepared according to the method detailed in Example A except that the amount of the components for forming the $LaNiO_3$/Ag mixture differs as follows: into a ball mill are inserted 13.5 grams of fine $LaNiO_3$ (45% by weight), 16.5 grams of $Ag_2O$ (55% by weight), 13.4778 grams of $H_2O$ and 0.4308 grams of Rohm-Haas dispersant D-3007. This process is repeated three more times in order to yield a total of four coated silver mesh screens according to Example C.

Example D (45/55 $LaNiO_3$/Ag Mixture) On a Nickel Mesh Screen

The mesh screen of Example D is prepared according to the method detailed in Example C except that a nickel mesh screen is used instead of the silver mesh screen of Example C. This process is repeated three more times in order to yield a total of four coated nickel mesh screens according to Example D.

With regard to the present invention, it should be noted that the above process can also be used to form a third electrode 104 in accordance with any of the other embodiments discussed above. Additionally, the second temperature at which the third electrode 104 and the $LaNiO_3$/metal mixture is heated to adhere, bond or fuse the $LaNiO_3$/metal mixture to the third electrode 104 is dependent upon the composition of both the third electrode 104 and the metal or metals present in the metal oxide portion of $LaNiO_3$/metal oxide mixture. That is, the second temperature at which bonding is conducted should be chosen so that the second temperature does not exceed the melting point of any metal or material present in the support structure of the third electrode 104 or the mixture with which it is coated. Alternatively, if the third electrode 104 contains non-metal materials, the second temperature is chosen so as not to exceed the decomposition temperature of any compound in the support structure of the third electrode 104.

One of each of the third electrodes from Examples A–D are subjected to testing on a potentiostat. No degradation is observed after subjecting $LaNiO_3$/Ag mixture coated mesh screens to the potentiostat for over 500 hours.

Additionally, one mesh screen according to each of Examples A–D are incorporated into a tricell between a zinc electrode and an air electrode (in this case the air electrode is formed from cobalt tetramethoxyphenyl porphine (CoTMPP), the metal electrode from zinc, and the electrolyte is a 32% aqueous solution of KOH).

Initially, with respect to the mesh screens according to Examples A and B, it was observed that the capacity of such a tricell decreased over time. Such a phenomenon was found to be attributable to the formation of ZnO coating on the third electrode, thereby reducing the capacity of the third electrode to produce oxygen. Such a phenomenon is due in part to the fact that both $LaNiO_3$ and ZnO are oxides and therefore have a great affinity for one another.

With regard to the mesh screens of Examples C and D, it was discovered that the increased amount of silver loading in the $LaNiO_3$/Ag mixture prevented such a phenomenon, thereby yielding a further improved third electrode with a longer life, as well as other desired properties.

Specifically, the tricells containing the third electrodes according to Examples C and D are subjected 30 complete discharge/charge cycles it was discovered that the third electrode maintained a stable third capacity (i.e., no degradation in capacity of the tricell was observed). In addition, it was found that a tricell incorporating such a third electrode had a satisfactory current even after 30 complete discharge/charge cycles. Additionally, the carbonate level in the electrolyte was low even after 30 complete discharge/charge cycles.

In view of the above, the weight ratio of lanthanum nickel compound:metal in the lanthanum nickel compound/metal mixture should be set to be in the range of about 70:30 to about 30:70, in another embodiment the weight ratio of lanthanum nickel compound:metal in the lanthanum nickel compound/metal mixture should be set to be in the range of about 60:40 to 40:60. In yet another embodiment, the weight ratio of lanthanum nickel compound:metal in the lanthanum nickel compound/metal mixture should be set to be in the range of about 55:45 to about 45:55. Such a weight ratio can be obtained by appropriately adjusting the weight percentages of the lanthanum nickel compound and the at least one metal oxide used to form the lanthanum nickel compound/metal mixture.

Additionally, it should also be noted that in one embodiment the amount of dispersant used to produce the lanthanum nickel compound/metal oxide mixture should not exceed about 10 weight percent based on the combined amount of lanthanum nickel compound and metal oxide present. As noted above, the dispersant of the present invention is not limited to Rohm-Haas polymer dispersant DURAMAX™ D-3007.

Alternatively, the amount of dispersant used to produce the lanthanum nickel compound/metal oxide mixture should not exceed about 5 weight percent based on the combined amount of lanthanum nickel compound and metal oxide present. In yet another embodiment, the amount of dispersant used to produce the lanthanum nickel compound/metal oxide mixture should not exceed about 2.5 weight percent based on the combined amount of lanthanum nickel compound and metal oxide present.

Figure 4:
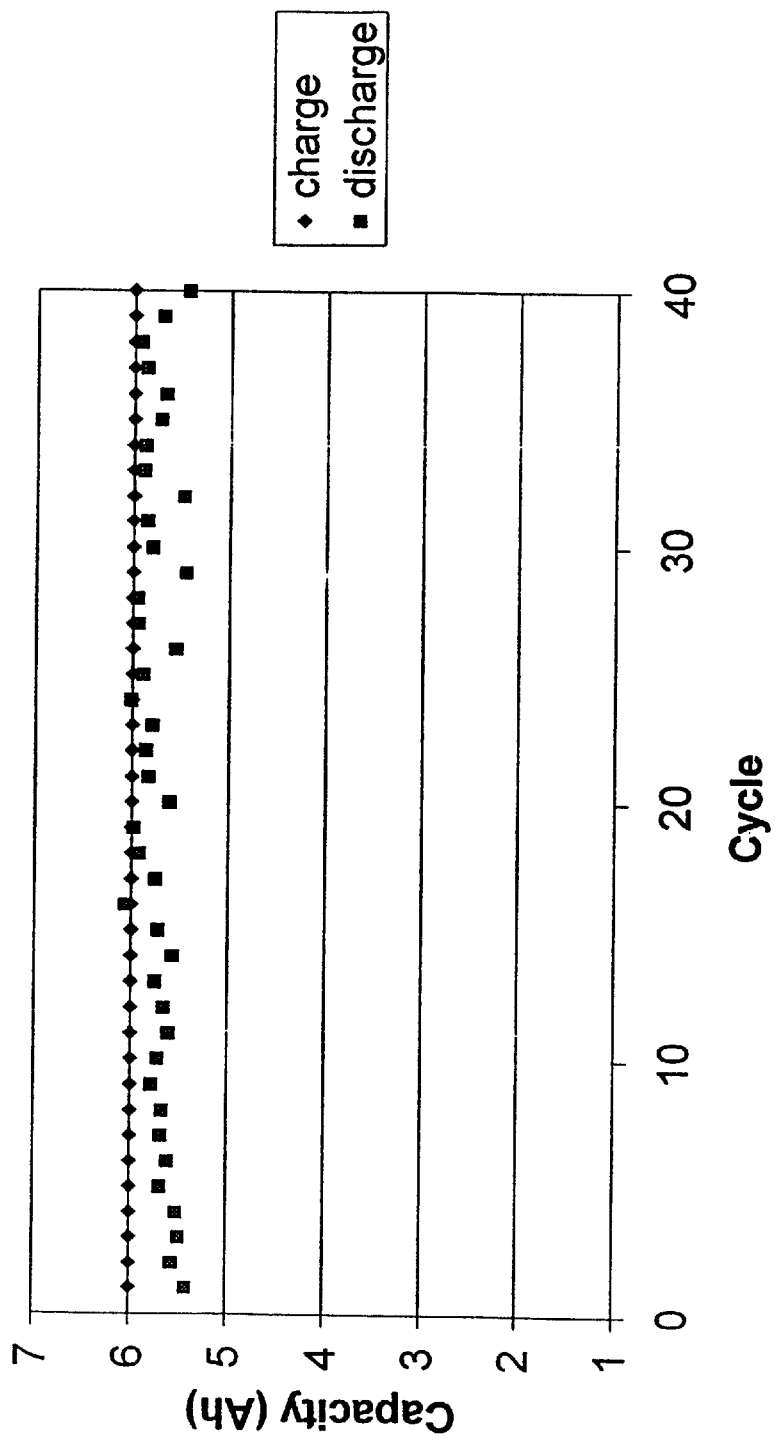
FIG. 4 is a graph representing the charge and discharge capacity of a tricell incorporating a third electrode in accordance with one embodiment of the present invention over a given number of cycles.

Next, a third electrode 104 according to Example D is incorporated into a tricell identical to that described above (i.e., the air electrode is formed from cobalt tetramethoxyphenyl porphine (CoTMPP), the metal electrode from zinc, and the electrolyte is a 32% aqueous solution of KOH) and the air electrode, metal electrode and third electrode are positioned in accordance with the embodiment of FIG. 1. As is shown in FIG. 4 the charge and discharge capacity of such a tricell is stable over time (e.g., 40 cycles).

It should also be noted, that the third electrode produced in accordance with the present invention is not restricted to use in just a zinc-air cell, but can be utilized in a wide range of metal-air cells. Also, other types of metal electrodes and air electrodes (e.g., a platinum electrode or a perovskite compound electrode such as $La_{0.6}Ca_{0.4}Co_{0.9}Fe_{0.1}O_3$) can be used in combination with a third electrode according to the present invention.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including any reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A third electrode for use in a metal-air tricell comprising a support structure coated with a layer of a mixture of a lanthanum nickel compound and at least one metal,
   wherein the mixture is adhered to the support structure without the use of an adhesive and the support structure is a mesh screen, a layer of woven filaments, an expanded mesh, a honeycomb or a metal planar sheet.

2. The third electrode of claim 1, wherein the lanthanum nickel compound is lanthanum nickelate.

3. The third electrode of claim 1, wherein the metal portion of the lanthanum nickel compound/at least one metal mixture is derived from a metal oxide selected from oxides of silver, tin, nickel, gold, palladium, cadmium, copper, or mixtures of two or more thereof.

4. The third electrode of claim 1, wherein the support structure is composed of a conductive metal selected from copper, nickel, titanium, steel, silver, gold, palladium, or mixtures of two or more thereof.

5. The third electrode of claim 1, wherein the support structure is a metal planar sheet which contains openings.

6. The third electrode of claim 5, wherein the openings in the metal planar sheet are either circular, rectangular, polygonal, trapezoidal, oval, or a combination of two or more of these shapes.

7. The third electrode of claim 6, wherein the openings constitute at least about 25% of the surface area of the face of the metal planar sheet.

8. The third electrode of claim 6, wherein the openings constitute at least about 75% of the surface area of the face of the metal planar sheet.

9. A third electrode for use in a metal-air tricell comprising a support structure coated with a layer of a mixture of a lanthanum nickel compound and at least one metal,
   wherein the mixture is adhered to the support structure without the use of an adhesive and the support structure is composed of a series of rigid rods or wires.

10. The third electrode of claim 9, wherein the series of rigid rods or wires are formed from a conductive metal selected from copper, nickel, titanium, steel, silver, gold, palladium, or mixtures of two or more thereof.

11. The third electrode of claim 9, wherein the series of rigid rods or wires are formed from a material selected from polypropylene, nylon, fluoropolymers, polyvinylchloride and mixtures of two or more thereof, and the series of rigid rods or wires are coated with a conductive metal selected from copper, nickel, titanium, steel, silver, gold, palladium, or mixtures of two or more thereof.

12. A metal-air tricell comprising:
an air electrode;
a metal electrode; and
a third electrode,
wherein the third electrode comprises a support structure coated with a mixture of a lanthanum nickel compound and at least one metal, wherein the mixture is adhered to the support structure without the use of an adhesive.

13. The metal-air tricell of claim 12, wherein the third electrode is positioned between the air electrode and the metal electrode.

14. The metal-air tricell of claim 12, wherein the metal electrode is positioned between the air electrode and the third electrode.

15. The metal-air tricell of claim 12, wherein the lanthanum nickel compound is lanthanum nickelate.

16. The metal-air tricell of claim 12, wherein the metal portion of the lanthanum nickel compound/at least one metal mixture is derived from a metal oxide selected from oxides of silver, tin, nickel, gold, palladium, cadmium, copper, or mixtures of two or more thereof.

17. The metal-air tricell of claim 12, wherein the support structure is a mesh screen, a layer of woven filaments, an expanded mesh, a honeycomb or a metal planar sheet.

18. The metal-air tricell of claim 17, wherein the support structure is composed of a conductive metal selected from copper, nickel, titanium, steel, silver, gold, palladium, or mixtures of two or more thereof.

19. The metal-air tricell of claims 18, wherein the support structure is a metal planar sheet which contains openings.

20. The metal-air tricell of claim 19, wherein the openings in the metal planar sheet are either circular, rectangular, polygonal, trapezoidal, oval, or a combination of two or more of these shapes.

21. The metal-air tricell of claim 20, wherein the openings constitute at least about 25% of the surface area of the face of the metal planar sheet.

22. The metal-air tricell of claim 20, wherein the openings constitute at least about 75% of the surface area of the face of the metal planar sheet.

23. The metal-air tricell of claim 12, wherein the support structure is composed of a series of rigid rods or wires.

24. The metal-air tricell of claim 23, wherein the series of rigid rods or wires are formed from a conductive metal selected from copper, nickel, titanium, steel, silver, gold, palladium, or mixtures of two or more thereof.

25. The metal-air tricell of claim 23, wherein the series of rigid rods or wires are formed from a material selected from polypropylene, nylon, fluoropolymers, polyvinylchloride, and mixtures of two or more thereof, and the series of rigid rods or wires are coated with a conductive metal selected from copper, nickel, titanium, steel, silver, gold, palladium, or mixtures of two or more thereof.

26. A method of forming a third electrode for use in a metal-air tricell comprising the steps of:
(A) applying a mixture of a lanthanum nickel compound and at least one metal oxide to a support structure, thereby yielding a coated support structure; and (B) heating the coated support structure in order to reduce the metal oxide present in the lanthanum nickel compound/metal oxide mixture to its corresponding metal and to adhere the lanthanum nickel compound/metal mixture to the support structure, thereby yielding a third electrode wherein the third electrode is free of an adhesive.

27. The method of claim 26, wherein step (A) comprises:
(A-1) mixing a lanthanum nickel compound, at least one metal oxide and at least one dispersant to form a lanthanum nickel compound/metal oxide suspension; and
(A-2) applying the lanthanum nickel compound/metal oxide suspension to the support structure to yield a coated support structure.

28. The method of claim 27, wherein the step (A-2) is accomplished by painting, spraying, atomization, or vapor deposition.

29. The method of claim 26, wherein in step (B) the coated support structure is heated for about 5 to about 20 hours at a temperature in the range of 150° C. to about 1350° C.

30. The method of claim 26, wherein step (B) further comprises:
(B-1) heating the coated support structure at a first temperature sufficient to reduce the metal oxide present in the lanthanum nickel compound/metal oxide mixture to its corresponding metal; and
(B-2) heating the coated support structure at a second temperature sufficient to adhere the lanthanum nickel/metal mixture to the support structure, without the use of an adhesive.

31. The method of claim 30, wherein in step (B-1) the coated support structure is heated for about 0.5 to about 2 hours at a temperature in the range of about 150° C. to about 450° C.

32. The method of claim 30, wherein in step (B-2) the coated support structure is heated for about 5 to about 20 hours at a temperature in range of about 450° C. to about 1350° C.

33. The method of claim 30, wherein in step (B-2) the coated support structure is heated for about 10 to about 15 hours at a temperature in range of about 850° C. to about 1050° C.

34. The method of claim 26, wherein the lanthanum nickel compound is lanthanum nickelate.

35. The method of claim 26, wherein the metal oxide is selected from oxides of silver, tin, nickel, gold, palladium, cadmium, copper or mixtures of two or more thereof.

36. The method of claim 26, wherein the support structure is a mesh screen, a layer of woven filaments, an expanded mesh, a honeycomb or a metal planar sheet.

37. The method of claim 36, wherein the support structure is composed of a conductive metal selected from copper, nickel, titanium, steel, silver, gold, palladium, or mixtures of two or more thereof.

38. The method of claim 37, wherein the support structure is a metal planar sheet which contains openings.

39. The method of claim 38, wherein the openings in the metal planar sheet are either circular, rectangular, polygonal, trapezoidal, oval, or a combination of two or more of these shapes.

40. The method of claim 39, wherein the openings constitute at least about 25% of the surface area of the face of the metal planar sheet.

41. The method of claim 39, wherein the openings are formed in the metal planar sheet by either punching, cutting, drilling, weaving, welding, soldering, brazing or casting.

42. The method of claim 26, wherein the support structure is composed of a series of rigid rods or wires.

43. The method of claim 42, wherein the series of rigid rods or wires are formed from a conductive metal selected from copper, nickel, titanium, steel, silver, gold, palladium, or mixtures of two or more thereof.

44. The method of claim 42, wherein the series of rigid rods or wires are formed from a material selected from polypropylene, nylon, fluoropolymers, polyvinylchloride, and mixtures of two or more thereof, and the series of rigid rods or wires are coated with a conductive metal selected from copper, nickel, titanium, steel, silver, gold, palladium, or mixtures of two or more thereof.

45. A method of forming a third electrode for use in a metal-air tricell comprising the steps of:

(A) forming a suspension of a lanthanum nickel compound, at least one metal oxide compound and at least one dispersant;

(B) applying the lanthanum nickel compound/metal oxide suspension to a support structure, thereby yielding a coated support structure;

(C) heating the coated support structure to drive off the dispersant, reduce the metal oxide present in the lanthanum nickel compound/metal oxide suspension to its corresponding metal and to adhere the resulting lanthanum nickel compound/metal mixture to the support structure, thereby yielding a third electrode wherein the third electrode is free of an adhesive.

* * * * *